US012798241B2

(12) United States Patent
Sakai

(10) Patent No.: US 12,798,241 B2
(45) Date of Patent: Nov. 17, 2026

(54) LIQUID DISCHARGE APPARATUS AND LIQUID DISCHARGE METHOD

(71) Applicant: Keitaroh Sakai, Kanagawa (JP)

(72) Inventor: Keitaroh Sakai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 135 days.

(21) Appl. No.: 18/690,299

(22) PCT Filed: Nov. 11, 2022

(86) PCT No.: PCT/IB2022/060861
§ 371 (c)(1),
(2) Date: Mar. 8, 2024

(87) PCT Pub. No.: WO2023/094927
PCT Pub. Date: Jun. 1, 2023

(65) Prior Publication Data
US 2024/0367437 A1 Nov. 7, 2024

(30) Foreign Application Priority Data
Nov. 24, 2021 (JP) ................................ 2021-190335

(51) Int. Cl.
*B41J 2/145* (2006.01)
*B41J 2/045* (2006.01)
*B41J 3/28* (2006.01)

(52) U.S. Cl.
CPC ........... *B41J 2/145* (2013.01); *B41J 2/04526* (2013.01); *B41J 2/0458* (2013.01);
(Continued)

(58) Field of Classification Search
CPC ...... B41J 2/145; B41J 2/04526; B41J 2/0458; B41J 2/04581; B41J 2/04588; B41J 3/28;
(Continued)

(56) References Cited

U.S. PATENT DOCUMENTS

2005/0104917 A1 5/2005 Shibata et al.
2010/0134547 A1 6/2010 Murai
(Continued)

FOREIGN PATENT DOCUMENTS

CN 107570663 A 1/2018
CN 107716856 A 2/2018
(Continued)

OTHER PUBLICATIONS

International Search Report and Written Opinion issued on Jan. 26, 2023 in PCT/IB2022/060861 filed on Nov. 11, 2022, 8 pages.
(Continued)

*Primary Examiner* — Henok D Legesse
(74) *Attorney, Agent, or Firm* — XSENSUS LLP

(57) ABSTRACT

A liquid discharge apparatus includes discharge nozzles, a carriage, a conveyor, and a controller. The discharge nozzles discharge liquid. The carriage holds the discharge nozzles. The conveyor conveys the carriage. The controller controls drawing of an object to be drawn, using the discharge nozzles. The controller draws an outer edge portion of the object using one discharge nozzle of the discharge nozzles in an outer-edge-portion drawing process, and draws a portion inside the outer edge portion of the object using another discharge nozzle of the discharge nozzles in an internal drawing process, the one discharge nozzle and said another discharge nozzle being different in characteristic.

15 Claims, 7 Drawing Sheets

(52) U.S. Cl.
CPC ....... *B41J 2/04581* (2013.01); *B41J 2/04588* (2013.01); *B41J 3/28* (2013.01)

(58) Field of Classification Search
CPC ......... B33Y 10/00; B33Y 50/02; B33Y 30/00; G06K 15/1877
See application file for complete search history.

(56) References Cited

U.S. PATENT DOCUMENTS

| | | | | |
|---|---|---|---|---|
| 2012/0147109 | A1* | 6/2012 | Ohnishi | B41J 2/2114 347/102 |
| 2018/0086098 | A1* | 3/2018 | Kumagai | B41J 2/2054 |
| 2020/0298269 | A1 | 9/2020 | Ooshiro et al. | |
| 2021/0245189 | A1 | 8/2021 | Manabe et al. | |
| 2022/0111406 | A1 | 4/2022 | Kudoh et al. | |

FOREIGN PATENT DOCUMENTS

| | | | |
|---|---|---|---|
| CN | 207579111 | U | 7/2018 |
| CN | 109834937 | A | 6/2019 |
| EP | 2468509 | A1 | 6/2012 |
| JP | 2000-118007 | A | 4/2000 |
| JP | 2005-145017 | A | 6/2005 |
| JP | 2006133671 | A | 5/2006 |
| JP | 2010-149499 | A | 7/2010 |
| JP | 2018-051991 | A | 4/2018 |
| JP | 2020-153289 | A | 9/2020 |
| JP | 2021-049478 | A | 4/2021 |
| JP | 2022-064483 | A | 4/2022 |
| WO | 2020/213383 | A1 | 10/2020 |

OTHER PUBLICATIONS

Office Action issued Jun. 24, 2025 in Japanese Patent Application No. 2021-190335, 10 pages.
Office Action issued Feb. 15, 2026 in Japanese Patent Application No. 202280075766.9, 8 pages.
Office Action issued Sep. 11, 2026 in related Chinese Patent Application No. 202280075766.9.

* cited by examiner

LIQUID DISCHARGE APPARATUS AND LIQUID DISCHARGE METHOD

CROSS-REFERENCE TO RELATED APPLICATIONS

The present application is based on PCT filing PCT/IB2022/060861, filed Nov. 11, 2022, which claims priority to Japanese Patent Application No. 2021-190335, filed on Nov. 24, 2021, the entire contents of each are incorporated herein by its reference.

TECHNICAL FIELD

The present disclosure relates to a liquid discharge apparatus and a liquid discharge method.

BACKGROUND ART

PTL 1 below discloses a technique for drawing a contour line along an outer edge of a design surface and then drawing a surface portion to be painted that is an inside portion excluding the outer edge, for the purpose of improving painting quality.

CITATION LIST

Patent Literature

[PTL 1] Japanese Patent No. 6775101

SUMMARY OF INVENTION

Technical Problem

However, since in the technique of PTL 1, a common nozzle is used in the process of drawing the contour line and the process of drawing a surface portion to be painted, optimum ink discharge is not performed in each process, and thus a high-quality object to be drawn is not drawn in a short time.

In order to solve the above-described problem of the related art, an object of the present disclosure is to draw a high-quality object to be drawn in a short time.

Solution to Problem

In order to solve the above-described problem, a liquid discharge apparatus includes discharge nozzles, a carriage, a conveyor, and a controller. The discharge nozzles discharge liquid. The carriage holds the discharge nozzles. The conveyor conveys the carriage. The controller controls drawing of an object to be drawn, using the discharge nozzles. The controller draws an outer edge portion of the object using one discharge nozzle of the discharge nozzles in an outer-edge-portion drawing process, and draws a portion inside the outer edge portion of the object using another discharge nozzle of the discharge nozzles in an internal drawing process, the one discharge nozzle and said another discharge nozzle being different in characteristic.

Advantageous Effects of Invention

According to an embodiment, the liquid discharge apparatus can draw a high-quality object in a short time.

BRIEF DESCRIPTION OF DRAWINGS

A more complete appreciation of embodiments of the present disclosure and many of the attendant advantages and features thereof can be readily obtained and understood from the following detailed description with reference to the accompanying drawings.

Figure 1:
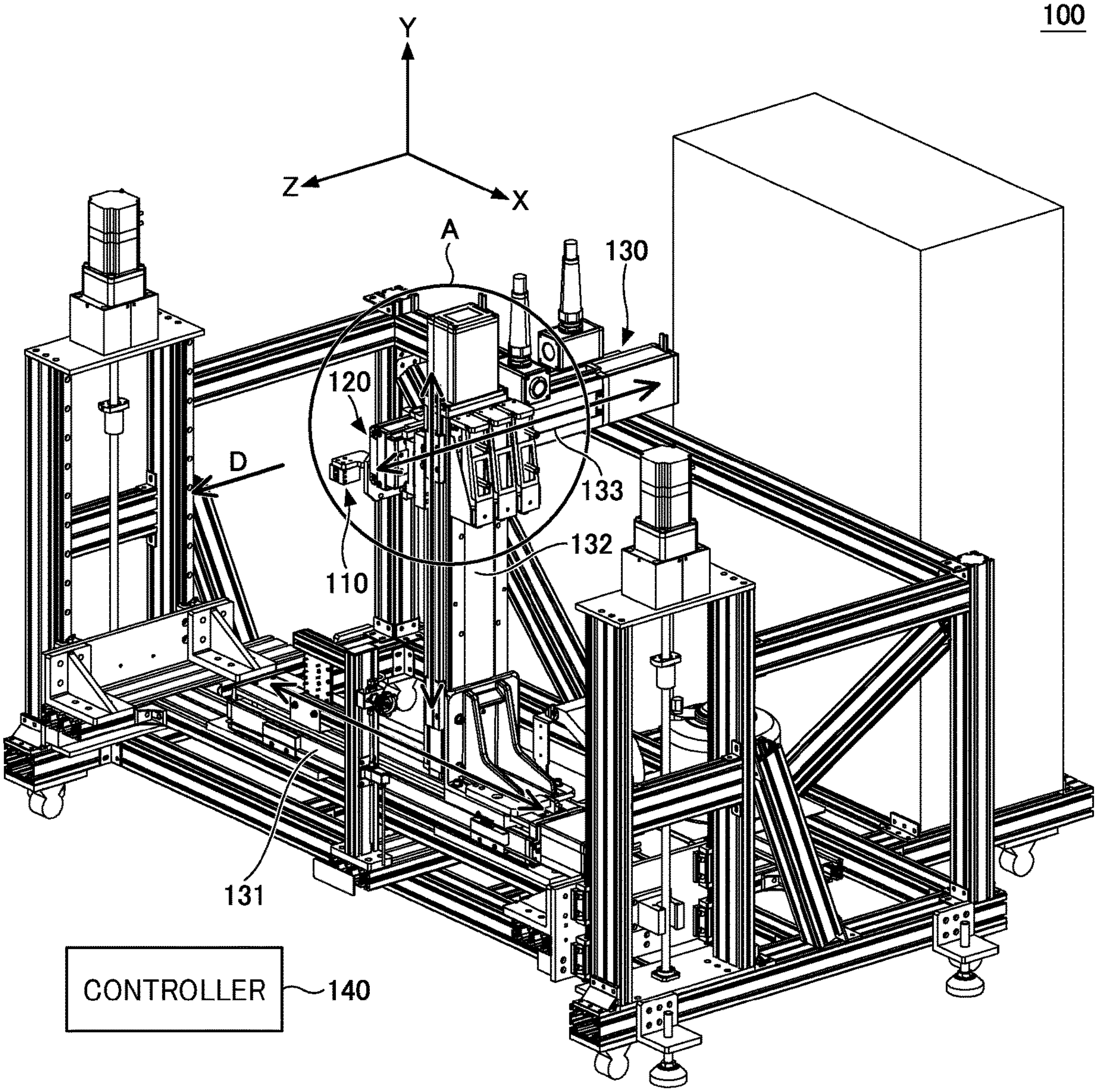
FIG. 1 is a diagram illustrating an example of a configuration of a painting apparatus according to an embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views. Referring now to the drawings, embodiments of the present disclosure are described below. As used herein, the singular forms “a,” “an,” and “the” are intended to include the plural forms as well, unless the context clearly indicates otherwise.

Configuration of Painting Apparatus

Figure 2:
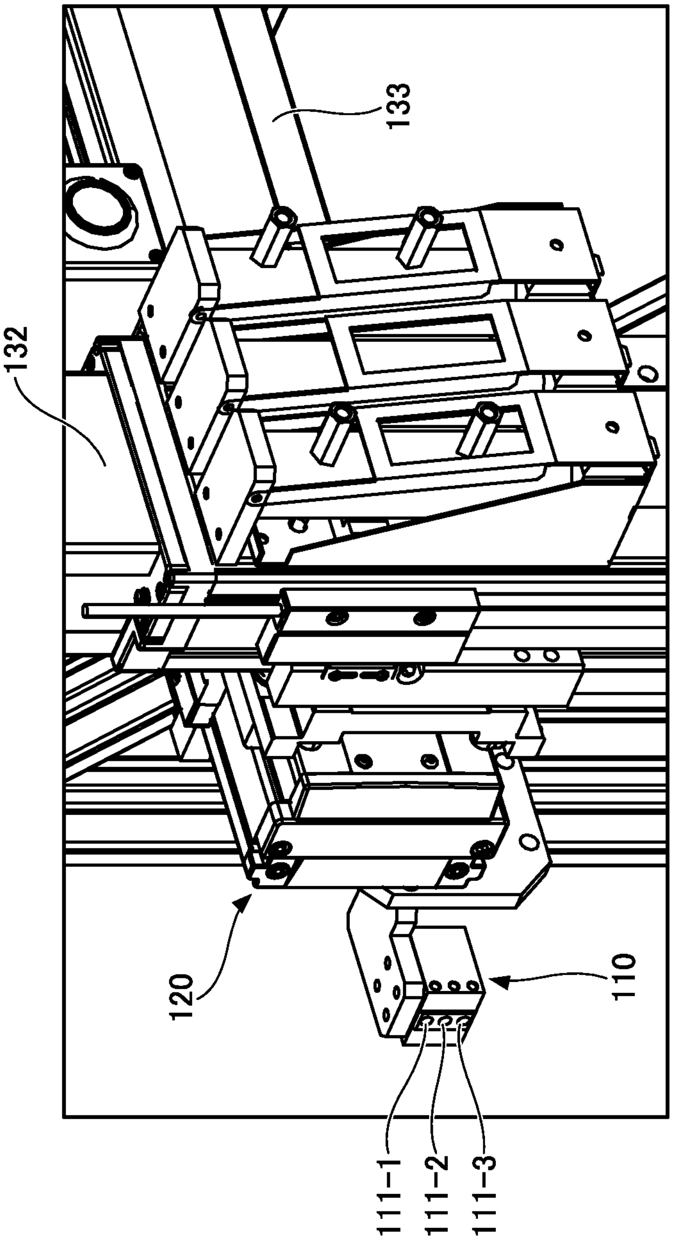
FIG. 2 is an enlarged view of a portion A of the painting apparatus illustrated in FIG. 1.

FIG. 1 is a diagram illustrating an example of a configuration of a painting apparatus 100 according to an embodiment. FIG. 2 is an enlarged view of a portion A of the painting apparatus 100 illustrated in FIG. 1. The painting apparatus 100 illustrated in FIG. 1 is an example of a “liquid discharge apparatus”. The painting apparatus 100 discharges paint (an example of “liquid”) toward an object for which drawing is to be performed and that is disposed in front (a Z-axis positive direction and an arrow direction D in the drawing) from a paint discharge device 110 while moving the paint discharge device 110, to draw an object to be drawn on the object for which drawing is to be performed.

As illustrated in FIGS. 1 and 2, the painting apparatus 100 includes the paint discharge device 110, a carriage 120, a conveyor 130, and a controller 140.

The paint discharge device 110 includes a plurality of discharge nozzles 111. The plurality of discharge nozzles 111 has different specifications (for example, nozzle diameters). As illustrated in FIG. 2, in the present embodiment, the paint discharge device 110 includes three discharge nozzles 111-1, 111-2, and 111-3 aligned in an up-down direction (Y-axis direction). All of the three discharge nozzles 111-1, 111-2, and 111-3 discharge paint with the front (the Z-axis positive direction and the arrow direction D in the drawing) as the discharge direction. However, the paint discharge device 110 is not limited to this example, and may include two or four or more discharge nozzles 111. Used as each of the plurality of discharge nozzles 111 is a discharge nozzle (mainly, an ink jet head or a bubble jet head) that adjusts the amount of the discharged paint.

For example, in a case where an ink jet head is used as the discharge nozzle 111, the discharge nozzle 111 includes an ink chamber, a discharge opening, an injection opening, and an actuator (for example, a piezoelectric element). In this case, in the discharge nozzle 111, a pressure applying means applies a pressure to a storage container that stores the paint, so that the paint is supplied from the storage container into the ink chamber via the injection opening. Furthermore, in the discharge nozzle 111, a voltage is applied to the actuator, and a pressure is applied to the paint in the ink chamber by the actuator, so that the paint is discharged from the ink chamber via the discharge opening.

For example, in a case where a bubble jet head is used as the discharge nozzle 111, the discharge nozzle 111 includes an injection opening, an ink chamber, a flow path, a discharge opening, an injection opening, and a heat generating body. In this case, in the discharge nozzle 111, the heat generating body boils the paint in the flow path to generate bubbles in the paint in the flow path, so that an amount of the paint corresponding to the volume of the bubbles is discharged from the discharge opening.

The carriage 120 holds the paint discharge device 110. More specifically, the carriage 120 is held movably in a front-rear direction (Z-axis direction) by a Z-axis conveyance rail 133 to be described later.

The conveyor 130 conveys the carriage 120 in an axis direction of each of three axes (X-axis, Y-axis, and Z-axis) orthogonal to each other. More specifically, the conveyor 130 includes an X-axis conveyance rail 131, a Y-axis conveyance rail 132, and the Z-axis conveyance rail 133.

The X-axis conveyance rail 131 is a rail extending linearly in a left-right direction (X-axis direction).

The Y-axis conveyance rail 132 is a rail extending linearly in the up-down direction (Y-axis direction). The Y-axis conveyance rail 132 is supported movably in the left-right direction (X-axis direction) by the X-axis conveyance rail 131.

The Z-axis conveyance rail 133 is a rail extending linearly in the front-rear direction (Z-axis direction). The Z-axis conveyance rail 133 is supported movably in the up-down direction (Y-axis direction) by the Y-axis conveyance rail 132. The Z-axis conveyance rail 133 holds the carriage 120 movably in the front-rear direction (Z-axis direction).

The conveyor 130 rotates the carriage 120 in each of a pitch direction, a roll direction, and a yaw direction, in addition to the above-described three axes (X-axis, Y-axis, and Z-axis).

The controller 140 controls the drawing of an object to be drawn using the discharge nozzles 111. More specifically, the controller 140 controls the conveyance of the carriage 120 by the conveyor 130 in each axis direction of the three axes (X-axis, Y-axis, and Z-axis), and the discharge of the paint by the discharge nozzles 111, to discharge the paint from the discharge nozzles 111 toward an object for which drawing is to be performed and that is disposed in front (the Z-axis positive direction) while moving the discharge nozzles 111, to draw an object to be drawn on the object for which drawing is to be performed.

For example, the controller 140 transmits a control signal to a driving motor for driving the Y-axis conveyance rail 132, to move the Y-axis conveyance rail 132 in the left-right direction (X-axis direction) along the X-axis conveyance rail 131, to move the carriage 120 in the left-right direction (X-axis direction).

For example, the controller 140 transmits a control signal to a driving motor for driving the Z-axis conveyance rail 133, to move the Z-axis conveyance rail 133 in the up-down direction (Y-axis direction) along the Y-axis conveyance rail 132, to move the carriage 120 in the up-down direction (Y-axis direction).

For example, the controller 140 transmits a control signal to a driving motor for driving the carriage 120, to move the carriage 120 in the front-rear direction (Z-axis direction) along the Z-axis conveyance rail 133.

The controller 140 rotates the carriage 120 in each of the pitch direction, the roll direction, and the yaw direction, in addition to the movement in the axis direction of each of the above-described three axes (X-axis, Y-axis, and Z-axis).

Each function of the controller 140 is implemented by one or a plurality of processing circuits. Here, the "processing circuit" in the present specification includes a processor programmed to execute each function by software like a processor implemented by an electronic circuit, and a device, such as an application specific integrated circuit (ASIC), a digital signal processor (DSP), a field programmable gate array (FPGA), or a conventional circuit module, designed to execute each function described above.

Procedure for Forming Object to be Drawn by Painting Apparatus

Figure 3:
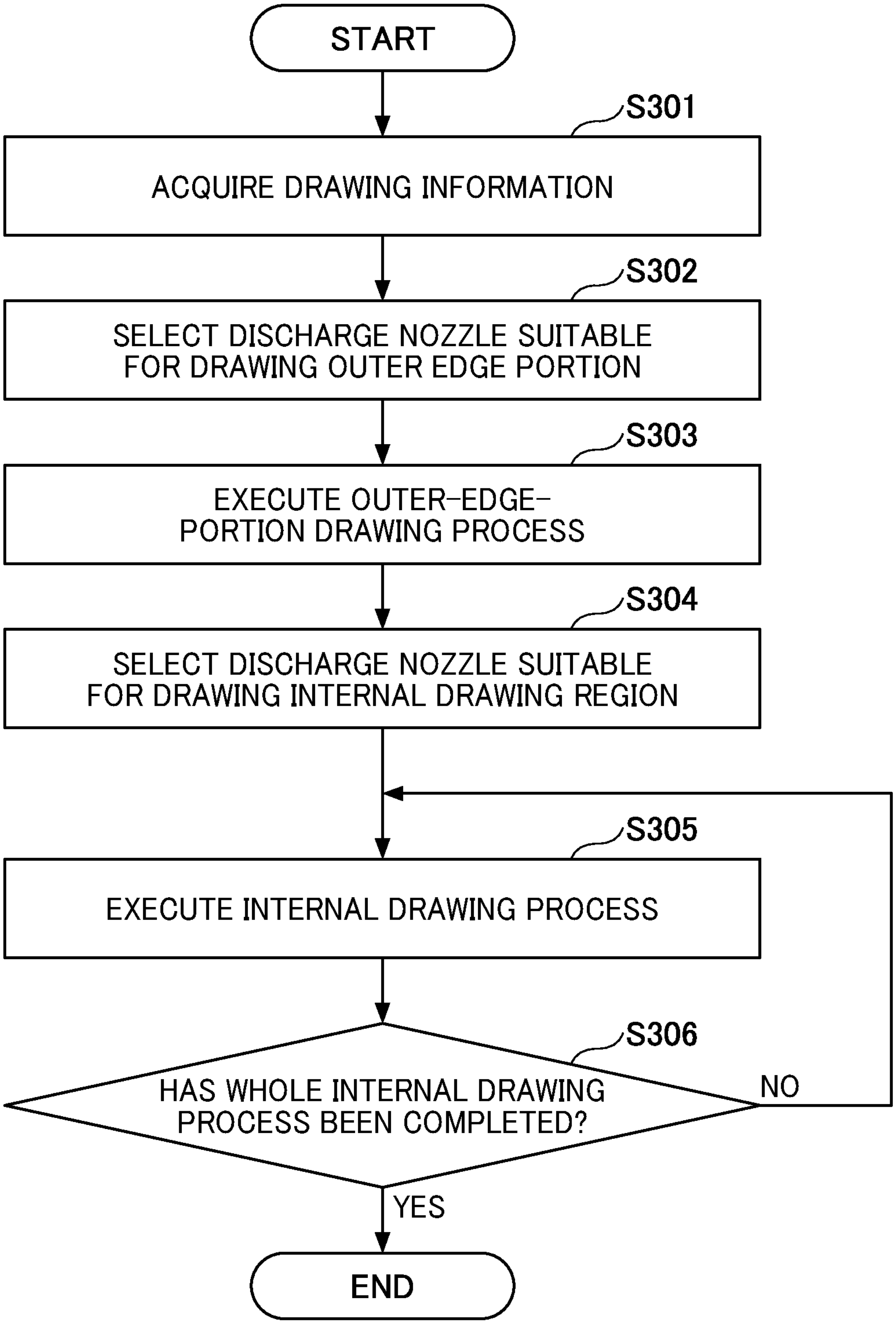
FIG. 3 is a flowchart illustrating an example of a procedure for processing by a controller included in the painting apparatus, according to an embodiment.
Figure 4C:
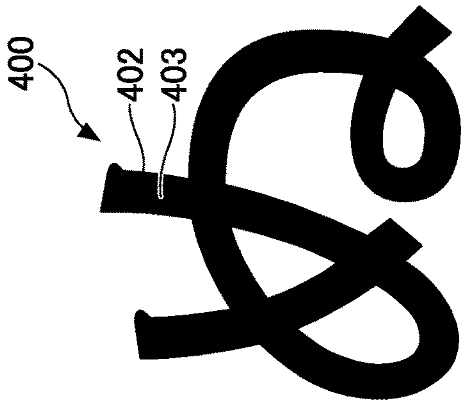
FIGS. 4A to 4C are diagrams illustrating an example of a procedure for forming an object to be drawn by the painting apparatus, according to an embodiment.
Figure 4B:
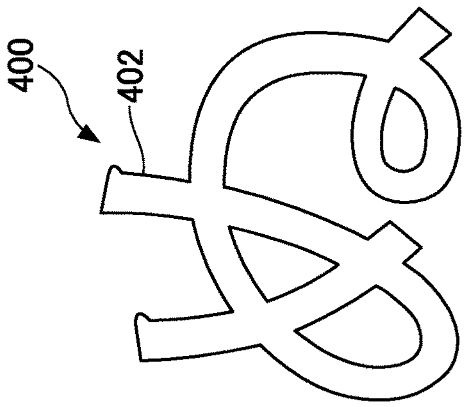
Figure 4A:
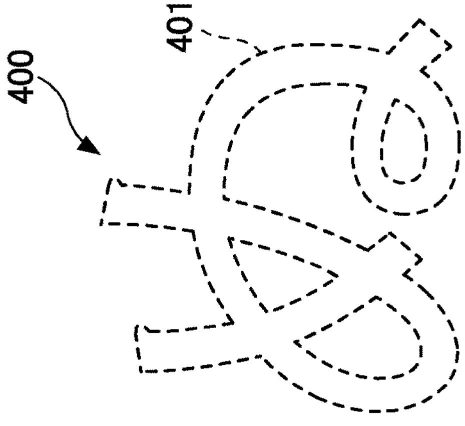

FIG. 3 is a flowchart illustrating an example of a procedure for processing by the controller 140 included in the painting apparatus 100, according to an embodiment. FIGS. 4A to 4C are diagrams illustrating an example of a procedure for forming an object to be drawn by the painting apparatus 100, according to an embodiment.

First, the controller 140 acquires drawing information for drawing an object to be drawn (step S301). For example, the controller 140 acquires the drawing information from an upper application (for example, a painting job execution application). For example, in an example illustrated in FIG. 4A, drawing information 401 of an object 400 to be drawn includes the outer edge shape of an object to be drawn. The drawing information 401 may include information about the color and the like.

Next, the controller 140 selects the discharge nozzle 111 suitable for drawing the outer edge portion, from the plurality of discharge nozzles 111 (step S302). The painting apparatus 100 may select the discharge nozzle 111 set in advance for an outer edge portion, or may select the suitable discharge nozzle 111 on the basis of the drawing information.

Next, on the basis of the drawing information acquired in step S301, the controller 140 executes an outer-edge-portion drawing process of drawing the outer edge portion of the object to be drawn using the discharge nozzle 111 selected in step S302 (step S303). More specifically, the controller 140 discharges the paint from the discharge nozzle 111 while moving the discharge nozzle 111 along the outer edge portion of the object to be drawn, to draw the outer edge portion of the object to be drawn. For example, in an example illustrated in FIG. 4B, an outer-edge-portion drawing process has been executed, so that an outer edge portion 402 of the object 400 to be drawn has been drawn.

Next, the controller 140 selects the discharge nozzle 111 suitable for drawing an internal drawing region, from the plurality of discharge nozzles 111 (step S304). The painting apparatus 100 may select the discharge nozzle 111 set in advance for an internal drawing region, or may select the suitable discharge nozzle 111 on the basis of the drawing information.

Next, on the basis of the drawing information acquired in step S301, the controller 140 executes an internal drawing process of drawing an internal drawing region, which is a portion inside the outer edge portion of the object to be drawn, along the outer edge portion of the object to be drawn, using the discharge nozzle 111 selected in step S304 (step S305). More specifically, the controller 140 discharges the paint from the discharge nozzle 111 while moving the discharge nozzle 111 along the outer edge portion in the internal drawing region, to draw the internal drawing region of the object to be drawn.

Next, the controller 140 determines whether or not the whole internal drawing process has been ended (step S306). For example, the controller 140 executes the internal drawing process a plurality of times to draw (that is, paint out) the whole internal drawing region of the object to be drawn.

In a case where in step S306, it is determined that the whole internal drawing process has not been ended (step S306: No), the controller 140 returns the processing to step S303.

On the other hand, in a case where in step S306, it is determined that the whole internal drawing process has been ended (step S306: Yes), the controller 140 ends the series of processing illustrated in FIG. 3. For example, in an example illustrated in FIG. 4C, a whole internal drawing process has been ended, so that an internal drawing region 403 inside the outer edge portion 402 of the object 400 to be drawn has been drawn a designated color.

As described above, the painting apparatus 100 according to the embodiment moves the discharge nozzle 111 along an outer edge portion of an object to be draw, to draw the object to be drawn. Therefore, the painting apparatus 100 finishes the edge of the outer edge portion more beautifully than a general serial-scanning recording apparatus.

Example of Drawing by Painting Apparatus (First Example)

Figure 5:
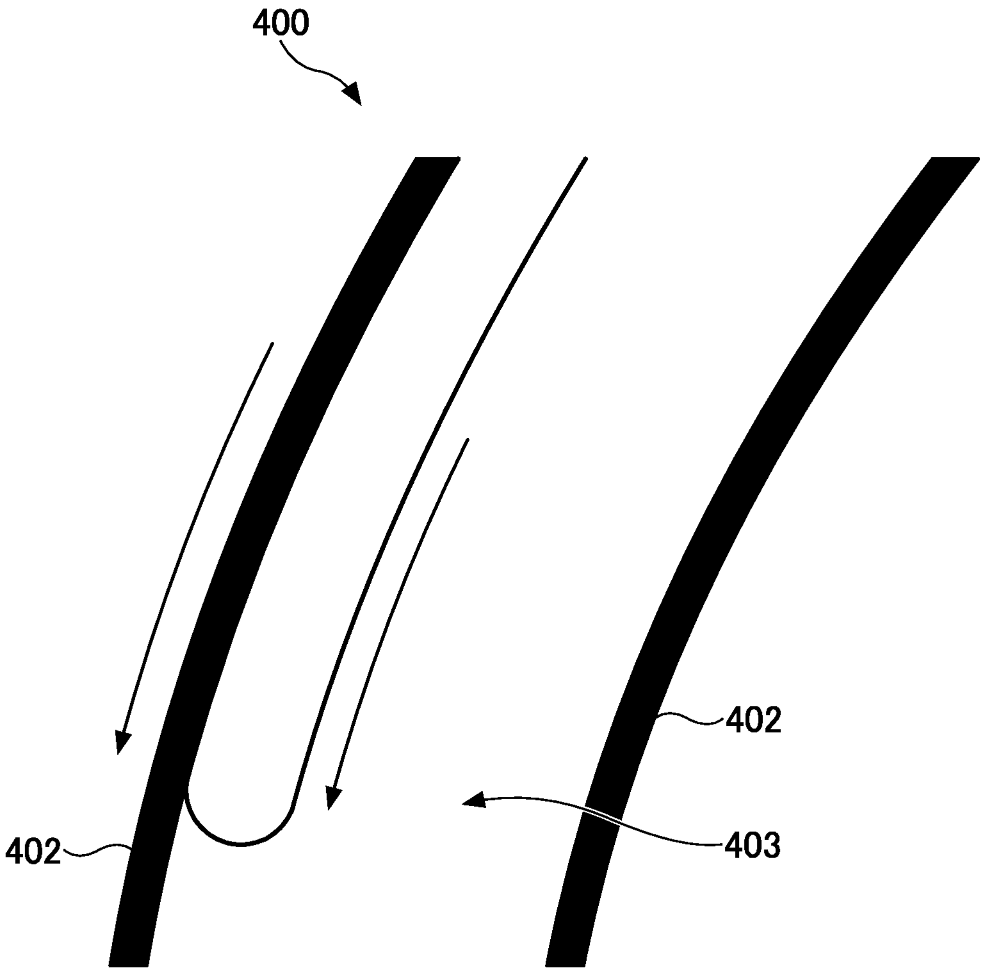
FIG. 5 is a diagram illustrating an example (first example) of drawing by the painting apparatus, according to an embodiment.

FIG. 5 is a diagram illustrating an example (first example) of drawing by the painting apparatus 100, according to an embodiment.

As illustrated in FIG. 5, under the control of the controller 140, the painting apparatus 100 according to the present embodiment draws an outer edge portion 402 along the outer edge portion 402 in an outer-edge-portion drawing process, and then draws an internal drawing region 403 inside the outer edge portion 402 along the outer edge portion 402 in an internal drawing process, to form an object 400 to be drawn.

At this time, as illustrated in FIG. 5, under the control of the controller 140, the painting apparatus 100 according to the present embodiment uses the different discharge nozzles 111 in the outer-edge-portion drawing process and the internal drawing process, so that a characteristic of the discharge nozzle 111 used in the outer-edge-portion drawing process is made different from a characteristic of the discharge nozzle 111 used in the internal drawing process. Here, the characteristics of the discharge nozzles 111 made different from each other are, for example, the thicknesses of the line widths (thicker or thinner), the lengths of the opening times per unit time (longer or shorter), and the like.

For example, the painting apparatus 100 according to the present embodiment uses the discharge nozzle 111 that performs drawing with a thinner line width in the outer-edge-portion drawing process, and uses the discharge nozzle 111 that performs drawing with a thicker line width in the internal drawing process.

In addition, under the control of the controller 140, the painting apparatus 100 according to the present embodiment makes various parameters of the discharge nozzles 111 different between the outer-edge-portion drawing process and the internal drawing process.

For example, in the outer-edge-portion drawing process, the painting apparatus 100 according to the present embodiment uses suitable parameters as the various parameters, so that satellites and mists are fewer, and thinner lines are drawn.

On the other hand, in the internal drawing process, the painting apparatus 100 according to the present embodiment uses suitable parameters as the various parameters, so that more paint is discharged, and thicker lines are drawn.

Examples of the various parameters include the diameter of the discharge nozzle 111, a drive amount of a movable component included in the discharge nozzle 111 (for example, the needle lift amount in the bubble jet head), a voltage waveform applied to the discharge nozzle 111, a pressure applied to the discharge nozzle 111 or the storage container that stores the paint, and the like.

For example, the painting apparatus 100 according to the present embodiment adopts at least one of the thinner diameter of the discharge nozzle 111, the smaller drive amount of a movable component included in the discharge nozzle 111, a shorter opening time per unit time of the discharge nozzle 111 determined by a voltage waveform applied to the discharge nozzle 111, and a lower pressure applied to the discharge nozzle 111 or the storage container that stores the paint in the outer-edge-portion drawing process than in the internal drawing process. Thus, the painting apparatus 100 performs drawing suitable for the outer-edge-portion drawing process.

On the other hand, the painting apparatus 100 according to the present embodiment adopts at least one of the thicker diameter of the discharge nozzle 111, the larger drive amount of a movable component included in the discharge nozzle 111, a longer opening time per unit time of the discharge nozzle 111 determined by a voltage waveform applied to the discharge nozzle 111, and a higher pressure applied to the discharge nozzle 111 or the storage container that stores the paint in the internal drawing process than in the outer-edge-portion drawing process. Thus, the painting apparatus 100 performs drawing suitable for the internal drawing process.

Suitable setting values of the various parameters described above may be obtained in advance by simulation, an actual-machine test, or the like, and may be adjusted according to the characteristics of the paint, an object to be actually drawn, or the like.

In the internal drawing process, the painting apparatus 100 according to the present embodiment may use the discharge nozzle 111 of a spray gun type to discharge more paint to draw thick lines.

As described above, the painting apparatus 100 according to the present embodiment uses the different discharge nozzles 111 in the outer-edge-portion drawing process and the internal drawing process, so that the drawing is performed with the characteristics of the discharge nozzles 111 suitable for each of the outer-edge-portion drawing process and the internal drawing process. As a result, a high-quality object to be drawn is drawn in a short time.

Example of Drawing by Painting Apparatus (Second Example)

Figure 6:
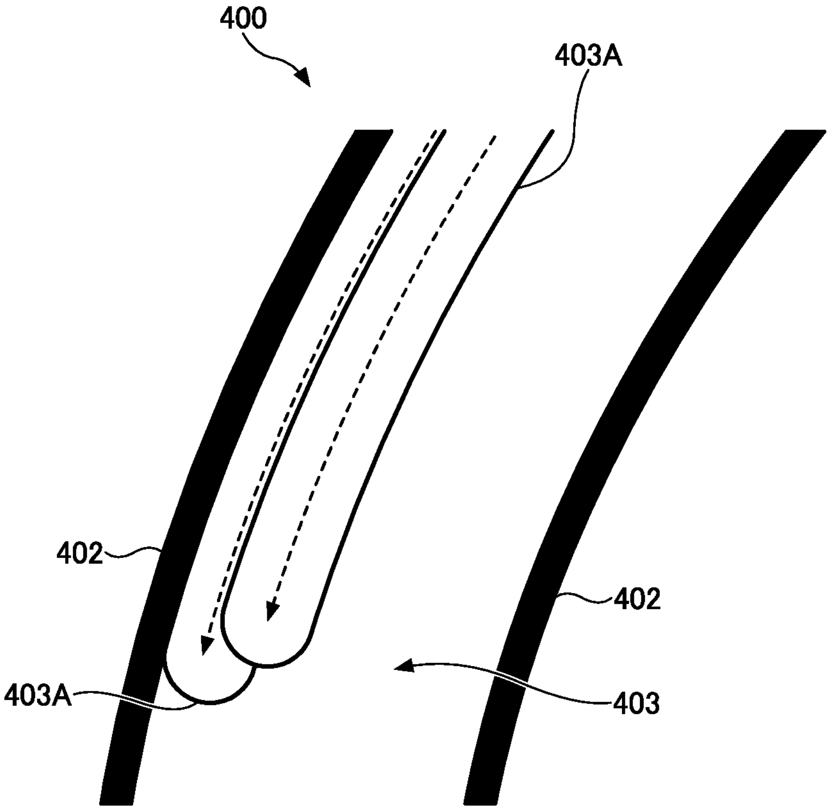
FIG. 6 is a diagram illustrating an example (second example) of drawing by the painting apparatus, according to an embodiment.

FIG. 6 is a diagram illustrating an example (second example) of drawing by the painting apparatus 100, according to an embodiment.

As illustrated in FIG. 6, under the control of the controller 140, the painting apparatus 100 according to the present embodiment draws an outer edge portion 402 along the outer edge portion 402 in an outer-edge-portion drawing process, and then executes a plurality of internal drawing processes to sequentially draw a plurality of drawn lines 403A (thicker lines) along the outer edge portion 402 on an internal drawing region 403 inside the outer edge portion 402 to paint out the internal drawing region 403 and form an object 400 to be drawn.

At this time, as illustrated in FIG. 6, under the control of the controller 140, the painting apparatus 100 according to the present embodiment overlaps the drawn line 403A drawn in the subsequent internal drawing process on the drawn line 403A drawn in the previous internal drawing process.

As a result, the painting apparatus 100 according to the present embodiment suppresses the generation of a gap (that is, an unpainted portion) between the drawn line 403A and the drawn line 403A due to variations in the discharge amount of the discharge nozzle 111, variations in carriage movement precision, and the like.

When the width of the overlapping region of the two adjacent drawn lines 403A is too large, the number of the drawn lines 403A increases. Thus, the productivity may decrease. Therefore, the width of the overlapping region may be, for example, ½ to ⅓ or less the width of the drawn line 403A.

Under the control of the controller 140, the painting apparatus 100 according to the present embodiment may overlap the drawn line 403A drawn in the subsequent internal drawing process on the outer edge portion 402 drawn in the outer-edge-portion drawing process.

Example of Drawing by Painting Apparatus (Third Example)

Figure 7:
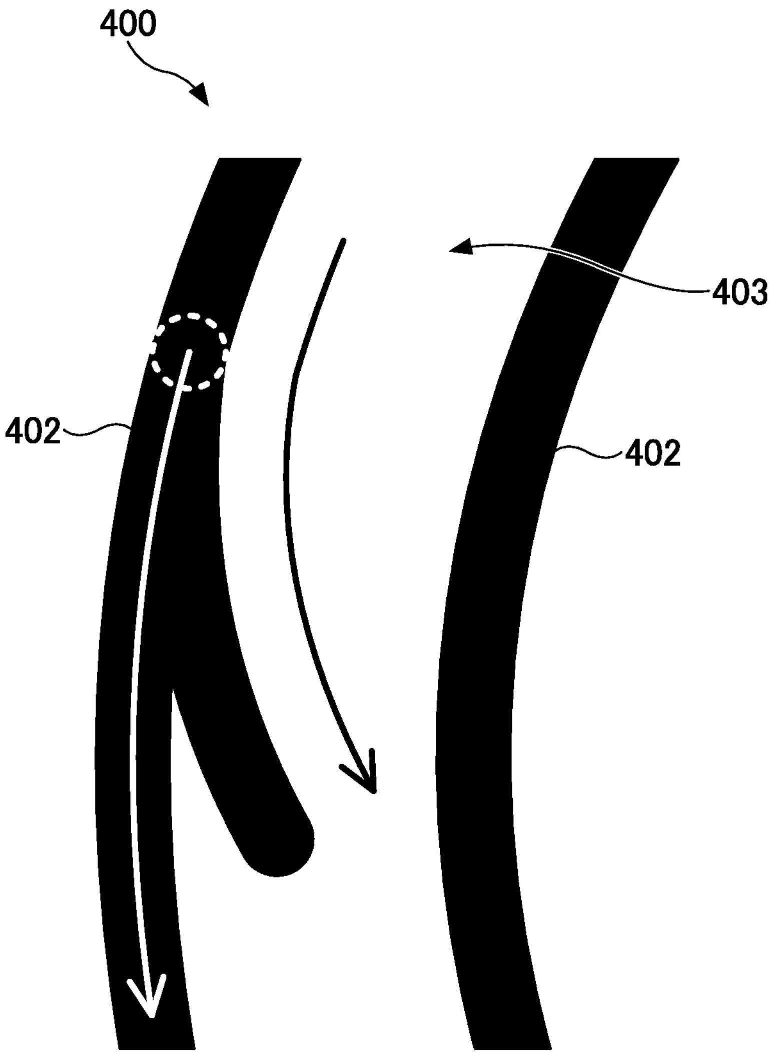
FIG. 7 is a diagram illustrating an example (third example) of drawing by the painting apparatus, according to an embodiment.

FIG. 7 is a diagram illustrating an example (third example) of drawing by the painting apparatus 100, according to an embodiment.

As illustrated in FIG. 7, in an outer-edge-portion drawing process, under the control of the controller 140, the painting apparatus 100 according to the present embodiment moves a drawing end position of an outer edge portion 402 to an internal drawing region 403 inside the outer edge portion 402.

Similarly, in an outer-edge-portion drawing process, under the control of the controller 140, the painting apparatus 100 according to the present embodiment moves a drawing start position of an outer edge portion 402 to an internal drawing region 403 inside the outer edge portion 402.

As a result, even if in an outer-edge-portion drawing process, the discharge of the paint is unstable at the start and end of the discharge of the paint, the painting apparatus 100 according to the present embodiment paints out the region drawn by the unstable discharge, in a subsequent internal drawing process.

Note that under the control of the controller 140, the painting apparatus 100 according to the embodiment may decelerate the moving speed of the discharge nozzle 111 at least at one of the start and end of drawing of an outer edge portion 402.

As described above, the painting apparatus 100 according to the present embodiment includes the discharge nozzles 111 that discharge liquid (paint), the carriage 120 that holds the discharge nozzles 111, the conveyor 130 that conveys the carriage 120, and the controller 140 that controls the drawing of an object to be drawn using the discharge nozzles 111, in which the controller 140 makes a characteristic of one of the discharge nozzles 111 used in an outer-edge-portion drawing process of drawing an outer edge portion of the object to be drawn different from a characteristic of another one of the discharge nozzles 111 used in an internal drawing process of drawing a portion inside the outer edge portion of the object to be drawn.

As a result, the painting apparatus 100 according to the present embodiment uses the characteristics of the discharge nozzles 111 suitable for drawing in each of the outer-edge-portion drawing process of drawing an outer edge portion of an object to be drawn and the internal drawing process of drawing a portion (internal drawing region) inside the outer edge portion of the object to be drawn. For example, in the outer-edge-portion drawing process, the discharge nozzle 111 that draws the outer edge portion with high definition is used, and in the internal drawing process, the discharge nozzle 111 that discharges more paint per unit time and quickly paints out the internal drawing region is used. Therefore, according to the painting apparatus 100 according to the present embodiment, optimum paint discharge is performed in each process. Therefore, a high-quality object to be drawn is drawn in a short time.

In the painting apparatus 100 according to the present embodiment, the controller 140 may perform the outer-edge-portion drawing process and the internal drawing process using the discharge nozzles 111 having different nozzle diameters.

As a result, the painting apparatus 100 according to the present embodiment uses the discharge nozzles 111 having suitable nozzle diameters in both the outer-edge-portion drawing process and the internal drawing process. Therefore, the painting apparatus 100 draws a high-quality object to be drawn in a short time.

In addition, in the painting apparatus 100 according to the present embodiment, the controller 140 may make drive amounts of movable components included in the discharge nozzles 111 different from each other between the outer-edge-portion drawing process and the internal drawing process.

As a result, the painting apparatus 100 according to the present embodiment provides suitable drive amounts of the movable components included in the discharge nozzles 111 in both the outer-edge-portion drawing process and the internal drawing process. Therefore, the painting apparatus 100 draws a high-quality object to be drawn in a short time.

In addition, in the painting apparatus 100 according to the present embodiment, the controller 140 may make voltage waveforms applied to the discharge nozzles 111 different from each other between the outer-edge-portion drawing process and the internal drawing process.

As a result, the painting apparatus 100 according to the present embodiment provides suitable opening times of the discharge nozzles 111 in both the outer-edge-portion drawing process and the internal drawing process. Therefore, the painting apparatus 100 draws a high-quality object to be drawn in a short time.

In addition, in the painting apparatus 100 according to the present embodiment, the controller 140 may make pressures applied to the discharge nozzles 111 or storage containers that store the paint different from each other between the outer-edge-portion drawing process and the internal drawing process.

As a result, the painting apparatus 100 according to the present embodiment provides suitable pressures applied to the discharge nozzles 111 or the storage containers in both the outer-edge-portion drawing process and the internal drawing process. Therefore, the painting apparatus 100 draws a high-quality object to be drawn in a short time.

In addition, in the painting apparatus 100 according to the present embodiment, the controller 140 may use the discharge nozzle 111 of a spray gun type in the internal drawing process.

As a result, in the internal drawing process, the painting apparatus 100 according to the present embodiment draws (that is, paints out) a portion inside an outer edge portion (internal drawing region) of an object to be drawn in a short time. Therefore, the painting apparatus 100 draws a high-quality object to be drawn in a short time.

In addition, in the painting apparatus 100 according to the present embodiment, in the internal drawing process, the controller 140 may vary the number of discharge nozzles 111 used for drawing an object to be drawn according to a feature of a drawing region where the object to be drawn is drawn (for example, the area, width, length, shape, character type, image to be drawn, region information to be drawn, and the like of an internal drawing region).

As a result, in the internal drawing process, the painting apparatus 100 according to the present embodiment selectively uses the plurality of suitable discharge nozzles 111. Therefore, the painting apparatus 100 draws a high-quality object to be drawn in a short time.

In addition, in the painting apparatus 100 according to the present embodiment, the controller 140 may perform drawing of a drawing region in a subsequent process in such a manner that the drawing region is overlapped with a drawing region drawn in a previous process.

As a result, the painting apparatus 100 according to the present embodiment suppresses the generation of a gap (that is, an unpainted portion) between the drawing region drawn in the previous process and the drawing region drawn in the subsequent process. Therefore, the painting apparatus 100 draws a high-quality object to be drawn in a short time.

Although embodiments of the present disclosure have been described in detail above, the present disclosure is not limited to these embodiments, and various modifications or changes are made within the scope of the gist of the present disclosure described in the claims.

A liquid discharge method according to an embodiment is a liquid discharge method to be performed with a liquid discharge apparatus including the discharge nozzles 111 that discharge paint, a carriage 120 that holds the discharge nozzles 111, and the conveyor 130 that conveys the carriage 120. The liquid discharge method includes an outer-edge-portion drawing process of drawing an outer edge portion of an object to be drawn, and an internal drawing process of drawing a portion inside the outer edge portion of the object to be drawn. A characteristic of one of the discharge nozzles 111 used in the outer-edge-portion drawing process is different from a characteristic of another one of the discharge nozzles 111 used in the internal drawing process.

As a result, in the liquid discharge method according to the present embodiment, the characteristics of the discharge nozzles 111 suitable for drawing are used in each of the outer-edge-portion drawing process of drawing an outer edge portion of an object to be drawn and the internal drawing process of drawing a portion (internal drawing region) inside the outer edge portion of the object to be drawn. For example, in the outer-edge-portion drawing process, the discharge nozzle 111 that draws the outer edge portion with high definition is used, and in the internal drawing process, the discharge nozzle 111 that discharges more paint per unit time and quickly paints out the internal drawing region is used. Therefore, according to the liquid discharge method according to the embodiment, optimum paint discharge is performed in each process. Therefore, a high-quality object to be drawn is drawn in a short time.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, a personal digital assistant, a Wireless Application Protocol (WAP) or third-generation (3G)-compliant mobile telephone, and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a Transmission Control Protocol/Internet Protocol (TCP/IP) signal carrying computer code over an IP network, such as the Internet. The carrier medium may also include a storage medium for storing processor readable code such as a floppy disk, a hard disk, a compact disc read-only memory (CD-ROM), a magnetic tape device, or a solid state memory device.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

REFERENCE SIGNS LIST

100 Painting apparatus (Liquid discharge apparatus)
110 Paint discharge device
111, 111-1, 111-2, 111-3 Discharge nozzle
120 Carriage
130 Conveyor
131 X-axis conveyance rail
132 Y-axis conveyance rail
133 Z-axis conveyance rail
140 Controller
400 Object to be drawn
401 Drawing information
402 Outer edge portion
403 Internal drawing region
403A Drawn line

The invention claimed is:

1. A liquid discharge apparatus, comprising:
discharge nozzles to discharge liquid;
a carriage that holds the discharge nozzles;
a conveyor configured to convey the carriage; and
a controller and a non-transitory computer-readable storage connected to the controller configured to control drawing of an object to be drawn, using the discharge nozzles,
the controller being configured to:
draw an outer edge portion of the object using one discharge nozzle of the discharge nozzles in an outer-edge-portion drawing process; and
draw a portion inside the outer edge portion of the object using another discharge nozzle of the discharge nozzles in an internal drawing process while moving the another discharge nozzle over the outer edge portion, the one discharge nozzle and the another discharge nozzle being different in characteristic.

2. The liquid discharge apparatus according to claim 1, wherein:
the controller is configured to perform the outer-edge-portion drawing process and the internal drawing process using the discharge nozzles having different nozzle diameters.

3. The liquid discharge apparatus according to claim 1, wherein:
the controller is configured to change drive amounts of movable components of the discharge nozzles between the outer-edge-portion drawing process and the internal drawing process.

4. The liquid discharge apparatus according to claim 1, wherein:
the controller is configured to change voltage waveforms applied to the discharge nozzles between the outer-edge-portion drawing process and the internal drawing process.

5. The liquid discharge apparatus according to claim 1, wherein:
the controller is configured to change pressures applied to the discharge nozzles or storage containers that store the liquid between the outer-edge-portion drawing process and the internal drawing process.

6. The liquid discharge apparatus according to claim 1, wherein:
the controller is configured to use a spray gun nozzle of the discharge nozzles in the internal drawing process.

7. The liquid discharge apparatus according to claim 1, wherein:
the controller is configured, in the internal drawing process, to change a number of discharge nozzles used for drawing the object, according to a feature of a drawing region in which the object is to be drawn.

8. The liquid discharge apparatus according to claim 1, wherein:
the controller is configured to draw the object in a manner such that a drawing region drawn in a subsequent process overlaps with a drawing region drawn in a preceding process to the subsequent process.

9. A liquid discharge method, comprising:
drawing an outer edge portion of an object to be drawn, using one discharge nozzle of a plurality of discharge nozzles; and
drawing a portion inside the outer edge portion of the object, using another discharge nozzle of the plurality of discharge nozzles while moving the another discharge nozzle over the outer edge portion, the one discharge nozzle and the another discharge nozzle being different in characteristic.

10. The liquid discharge method according to claim 9, wherein:
the drawing of the outer edge portion and the drawing of the portion inside the outer edge portion are performed using the discharge nozzles having different nozzle diameters.

11. The liquid discharge method according to claim 9, further comprising:
changing drive amounts of movable components of the discharge nozzles between the drawing of the outer edge portion and the drawing of the portion inside the outer edge portion.

12. The liquid discharge method according to claim 9, further comprising:
changing voltage waveforms applied to the discharge nozzles between the drawing of the outer edge portion and the drawing of the portion inside the outer edge portion.

13. The liquid discharge method according to claim 9, further comprising:
changing pressures applied to the discharge nozzles or storage containers that store the liquid between the drawing of the outer edge portion and the drawing of the portion inside the outer edge portion.

14. The liquid discharge method according to claim 9, wherein:
the drawing the portion inside the outer edge portion of the object uses a spray gun nozzle.

15. The liquid discharge method according to claim 9, further comprising:
changing, for the drawing the portion inside the outer edge portion, a number of discharge nozzles used for drawing the object, according to a feature of a drawing region in which the object is to be drawn.

* * * * *